(12) United States Patent
Scalley

(10) Patent No.: US 10,486,210 B2
(45) Date of Patent: Nov. 26, 2019

(54) SOLVENT BLEND PROCESS AND PRODUCTS

(71) Applicant: RECOVER ENERGY SERVICES INC., Calgary (CA)

(72) Inventor: Matthew Scalley, Calgary (CA)

(73) Assignee: RECOVER ENERGY SERVICES INC., Calgary, Alberta (CA)

( * ) Notice: Subject to any disclaimer, the term of this patent is extended or adjusted under 35 U.S.C. 154(b) by 0 days.

(21) Appl. No.: 15/981,576

(22) Filed: May 16, 2018

(65) Prior Publication Data

US 2018/0333757 A1 Nov. 22, 2018

Related U.S. Application Data

(60) Provisional application No. 62/506,846, filed on May 16, 2017.

(51) Int. Cl.
*B09C 1/00* (2006.01)
*B09C 1/02* (2006.01)
*E21B 21/06* (2006.01)
*B01D 11/02* (2006.01)

(52) U.S. Cl.
CPC .............. *B09C 1/02* (2013.01); *B01D 11/028* (2013.01); *B01D 11/0288* (2013.01); *B01D 11/0292* (2013.01); *E21B 21/066* (2013.01)

(58) Field of Classification Search
CPC . E21B 21/066; E21B 21/065; B01D 11/0203; B09C 1/02
See application file for complete search history.

(56) References Cited

U.S. PATENT DOCUMENTS

| | | |
|---|---|---|
| 4,434,028 A | 2/1984 | Eppig et al. |
| 4,824,570 A | 4/1989 | Bethuel et al. |
| 4,836,302 A | 6/1989 | Heilhecker et al. |
| 5,005,655 A | 4/1991 | Stokke et al. |
| 5,080,721 A | 1/1992 | Flanigan et al. |
| 6,550,552 B1 | 4/2003 | Pappa et al. |
| 2004/0089321 A1 | 5/2004 | Stone |
| 2005/0236015 A1 | 10/2005 | Goel et al. |

*Primary Examiner* — Carib A Oquendo
(74) *Attorney, Agent, or Firm* — Greenblum & Bernstein, P.L.C.

(57) ABSTRACT

Solvent blend processes and products. A solvent blend particularly adapted for use in a solvent extraction process for decontaminating drill cutting waste containing drilling fluid base oil, or soil containing hydrocarbon liquids within the soil matrix is described where the solvent blend is recovered from, and contains extracted contaminants from, a solvent extraction and solvent and solute recovery process, and the solvent blend, when re-used in a solvent extraction process, demonstrates improved selectivity for dissolving solutes as compared to a non-contaminant containing solvent. The recovered, decontaminated solids are also described.

20 Claims, 3 Drawing Sheets

SOLVENT BLEND PROCESS AND PRODUCTS

CROSS-REFERENCE TO RELATED APPLICATION

This application is a Non-Provisional application claiming the benefit under 35 U.S.C. § 119(e) of U.S. Provisional Application No. 62/506,846 filed May 16, 2017, the disclosure of which is expressly incorporated by reference in its entirety.

TECHNICAL FIELD

This field of art to which this invention generally pertains is solvent compositions, and in particular, to processes for producing solvent compositions.

BACKGROUND

Separation by solvent extraction has been used since ancient times to recover useful products otherwise bound in solid substrates, such as organic leafy materials, or other liquids that render the product less useful. The Chinese used hot water to extract tea flavours from tea leaves as early as 1000 B.C.

Solvent extraction is classified into two main categories; liquid-liquid extraction, and solid-liquid extraction.

Liquid extraction is used to separate two miscible liquids by use of a solvent that preferentially dissolves one of them. Where separation by distillation is not possible or impractical, such as when products cannot tolerate the high temperatures required (even under vacuum), or when two liquids have very close boiling points, then liquid extraction is one of the main alternatives.

For example, temperature sensitive penicillin is commercially extracted from a fermentation broth using butyl acetate as a solvent.

As another example, in lube oil fractions containing aromatics, paraffins and naphthenes, the aromatic compounds typically have poor viscosity-temperature characteristics for the desired applications. Since the unwanted compounds have similar and overlapping boiling point ranges, they cannot effectively be distilled. Instead, the aromatics are extracted from the mixture using a polar solvent such as phenol or furfural, leaving the preferred products behind.

Solid-liquid extraction, also called leaching, uses a solvent to extract soluble matter from an insoluble solid substrate. The use of leaching is widespread throughout a full range of industries; agricultural industries in particular, use leaching to produce many otherwise non-recoverable products. Many edible oils are produced using solvent extraction to recover the oils held within the grains for example, canola oil from canola seed.

Table 1 below lists some well-known commercial and industrial applications of solid-liquid solvent extraction processes.

TABLE 1

Examples of Solid-Liquid Solvent Extraction Processes

| Process | Solute | Solvent | Solid |
|---|---|---|---|
| Beer production | Malted Barley Extract | Water | Barley Grain |
| Tea Brewing | Tea Flavour | Water | Tea Leaves |
| Coffee production | Coffee Flavour | Water | Coffee Beans |
| Soybean Edible Oil production | Soybean Oil | Hexane | Soybeans |
| Canola Oil production | Canola Oil | Hexane | Canola Seeds |
| Sugar production | Sugar | Water | Sugar Beets |
| Bayer process for Aluminum metal production | Aluminum Oxide | Sodium Hydroxide | Bauxite Ore |

During the drilling of a well, for example for gas or oil, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid.

One of the many functions of drilling fluid is to help carry away solid debris that forms during the drilling operation. Shales, clays, and formation debris continually slough off the walls of the well bore and into the drilling fluid. These cuttings hinder drilling fluid performance if allowed to accumulate. The accumulation of Low Gravity Solids (LGS) in an active drilling mud system is of significant concern to drilling well operators because they contribute to increased wear of high volume circulating equipment, they can cause the drill string to become differentially stuck in porous formations leading to expensive drilling downtime, and they contribute to reduced rates of drilling penetration, commonly known by those in the industry as the Rate of Penetration (ROP). LGS are continuously removed from the drilling operation by first carrying them to the surface in the mud, followed by removal at the surface.

The current state of the art for on-site drilling waste management is to recover drilling fluid from the cuttings using a combination of shale shakers, and decanter centrifuges. They operate on the principle of separation by mass density difference between the drilling fluid and the cuttings. Shale shakers can induce artificially high gravitational accelerations up to approximately 4 to 8 g, which aid the otherwise terrestrial 1 g acceleration used in conventional settling. Rotational velocity used in decanter centrifuges can induce accelerations of several thousand times that of terrestrial gravitational acceleration. The recovered drilling mud is recycled back to the drilling operation.

Despite many improvements to many different types of drill site cuttings treatment equipment throughout the well-established drilling industry, there remains a waste stream of drill cuttings that contains some drilling fluid held within the solids.

Accordingly, there is a constant search for new technologies and improvements to existing technologies to increase the efficiency and effectiveness of reclaiming and recycling processes.

BRIEF SUMMARY

A solvent blend is described particularly adapted for use in a solvent extraction process for decontaminating drill cutting waste containing drilling fluid base oil, or soil containing hydrocarbon liquids within the soil matrix, where the solvent blend is recovered from, and contains extracted contaminants from, a solvent extraction and solvent and solute recovery process, and the solvent blend, when re-used in a solvent extraction process, demonstrates improved selectivity for dissolving solutes as compared to a non-contaminant containing solvent.

Additional embodiments include: the solvent blend described above where the solvent extraction process comprises the decontamination of soil containing hydrocarbon liquids within the soil matrix; the solvent blend described above where the solvent extraction process comprises the decontamination of drill cutting waste containing drilling fluid base oil; the solvent blend described above where the solvent blend is particularly adapted to be recycled to the decontamination process of soil containing hydrocarbon liquids within the soil matrix; the solvent blend described above where the solvent blend is particularly adapted to be recycled to the decontamination process of drill cutting waste containing drilling fluid base oil; the solvent blend described above where the solvent blend contains at least one straight chain hydrocarbon, branched hydrocarbon, or cyclic hydrocarbon, wherein more than 90% by volume of the hydrocarbons contain seven carbon atoms or less; the solvent blend described above where the solvent blend contains at least one straight chain hydrocarbon, branched hydrocarbon, or cyclic hydrocarbon, wherein more than 95% by volume of the hydrocarbons contain eight carbon atoms or less; the solvent blend described above where the solvent blend contains at least one straight chain hydrocarbon, branched hydrocarbon, or cyclic hydrocarbon, wherein more than 99% by volume of the hydrocarbons contain nine carbon atoms or less; the solvent blend described above where the solvent blend contains at least one straight chain hydrocarbon, branched hydrocarbon, or cyclic hydrocarbon, wherein less than 1% by volume of the hydrocarbons contain five carbon atoms or less; the solvent blend described above where the solvent blend has a normal boiling point between 60° C. and 80° C.; the solvent blend described above where the solvent blend has a normal boiling point between 65° C. and 75° C.; the solvent blend described above where the solvent blend has a standard mass density at 15° C. of 600 kg/m$^3$ to 850 kg/m$^3$; the solvent blend described above where the solvent blend has a standard mass density at 15° C. of 630 kg/m$^3$ to 750 kg/m$^3$; the solvent blend described above where the solvent blend has a distribution coefficient at least 5% greater than the distribution coefficient of a non-contaminant containing solvent; the solvent blend described above where the solvent blend has a distribution coefficient at least 10% greater than the distribution coefficient of a non-contaminant containing solvent; the solvent blend described above where the solvent blend has a distribution coefficient at least 15% greater than the distribution coefficient of a non-contaminant containing solvent; and the solvent blend described above where the solvent blend has a distribution coefficient at least 20% greater than the distribution coefficient a non-contaminant containing solvent.

A solvent extraction process is also described for decontaminating drill cutting waste containing drilling fluid base oil, or soil containing hydrocarbon liquids within the soil matrix, where drill cutting waste or soil is treated with at least one solvent, and the at least one solvent and a residual solute are recovered from the extraction process, and wherein the recovered solvent contains extracted contaminants from the recovery process and the recovered solvent, when re-used in a solvent extraction process, demonstrates improved selectivity for dissolving solutes as compared to a non-contaminant containing solvent.

Additional embodiments include: the process described above where the solvent extraction process comprises the decontamination of drill cutting waste containing drilling fluid base oil; the process described above where the solvent extraction process comprises the decontamination of soil containing hydrocarbon liquids within the soil matrix; the process described above where the recovered solvent is recycled to the decontamination process of soil containing hydrocarbon liquids within the soil matrix; the process described above where the recovered solvent is recycled to the decontamination process of drill cutting waste containing drilling fluid base oil; the process described above where the recovered solvent contains at least one straight chain hydrocarbon, branched hydrocarbon, or cyclic hydrocarbon, wherein more than 90% by volume of the hydrocarbons contain seven carbon atoms or less; the process described above where the recovered solvent contains at least one straight chain hydrocarbon, branched hydrocarbon, or cyclic hydrocarbon, wherein more than 95% by volume of the hydrocarbons contain eight carbon atoms or less; the process described above where the recovered solvent contains at least one straight chain hydrocarbon, branched hydrocarbon, or cyclic hydrocarbon, wherein more than 99% by volume of the hydrocarbons contain nine carbon atoms or less; the process described above where the recovered solvent contains at least one straight chain hydrocarbon, branched hydrocarbon, or cyclic hydrocarbon, wherein less than 1% by volume of the hydrocarbons contain five carbon atoms or less; the process described above where the recovered solvent has a normal boiling point between 60° C. and 80° C.; the process described above where the recovered solvent has a normal boiling point between 65° C. and 75° C.; the process described above where the recovered solvent has a standard mass density at 15° C. of 600 kg/m$^3$ to 850 kg/m$^3$; the process described above where the recovered solvent has a standard mass density at 15° C. of 630 kg/m$^3$ to 750 kg/m$^3$; the process described above where the recovered solvent has a distribution coefficient at least 5% greater than the distribution coefficient of a non-contaminant containing solvent; the process described above where the recovered solvent has a distribution coefficient at least 10% greater than the distribution coefficient of a non-contaminant containing solvent; the process described above where the recovered solvent has a distribution coefficient at least 15% greater than the distribution coefficient of a non-contaminant containing solvent; the process described above where the recovered solvent has a distribution coefficient at least 20% greater than the distribution coefficient a non-contaminant containing solvent; the process described above where the residual solute concentration in the decontaminated solids has been reduced to less than 5% by mass; the process described above where the residual solute concentration in the decontaminated solids has been reduced to less than 3% by mass; the process described above where the residual solute concentration in the decontaminated solids has been reduced to less than 1% by mass; the process described above where the residual solute concentration in the decontaminated solids has been reduced to less than 0.1% by mass; the process described above where the residual solute concentration in the decontaminated solids has been reduced by at least 1% by mass as compared to the solvent extraction using a single virgin solvent alone; the process described above where the residual solute concentration in the decontaminated solids has been reduced by at least 5% by mass as compared to the solvent extraction using a single virgin solvent alone; the process described above where the residual solute concentration in the decontaminated solids has been reduced by at least 20% by mass as compared to the solvent extraction using a single virgin solvent alone; and the process described above where the residual solute concentration in the decontaminated solids has been reduced by at least 50% by mass as compared to the solvent extraction using a single virgin solvent alone.

Decontaminated solids are also described, wherein the decontaminated solids are recovered from a solvent extraction and solvent and residual solute recovery process.

Additional embodiments include: the decontaminated solids described above where the residual solute concentration in the decontaminated solids has been reduced to less than 5% by mass; the decontaminated solids described above where the residual solute concentration in the decontaminated solids has been reduced to less than 3% by mass; the decontaminated solids described above where the residual solute concentration in the decontaminated solids has been reduced to less than 1% by mass; the decontaminated solids described above where the residual solute concentration in the decontaminated solids has been reduced to less than 0.1% by mass; the decontaminated solids described above where the residual solute concentration in the decontaminated solids has been reduced by at least 1% by mass as compared to solvent extraction using a non-contaminant containing solvent; the decontaminated solids described above where the residual solute concentration in the decontaminated solids has been reduced by at least 5% by mass as compared to solvent extraction using a non-contaminant containing solvent; the decontaminated solids described above where the residual solute concentration in the decontaminated solids has been reduced by at least 20% by mass as compared to solvent extraction using non-contaminant containing solvent; and the decontaminated solids described above where the residual solute concentration in the decontaminated solids has been reduced by at least 50% by mass as compared to solvent extraction using a non-contaminant containing solvent.

These, and additional embodiments, are described in greater detail below.

DETAILED DESCRIPTION

Figure 1:
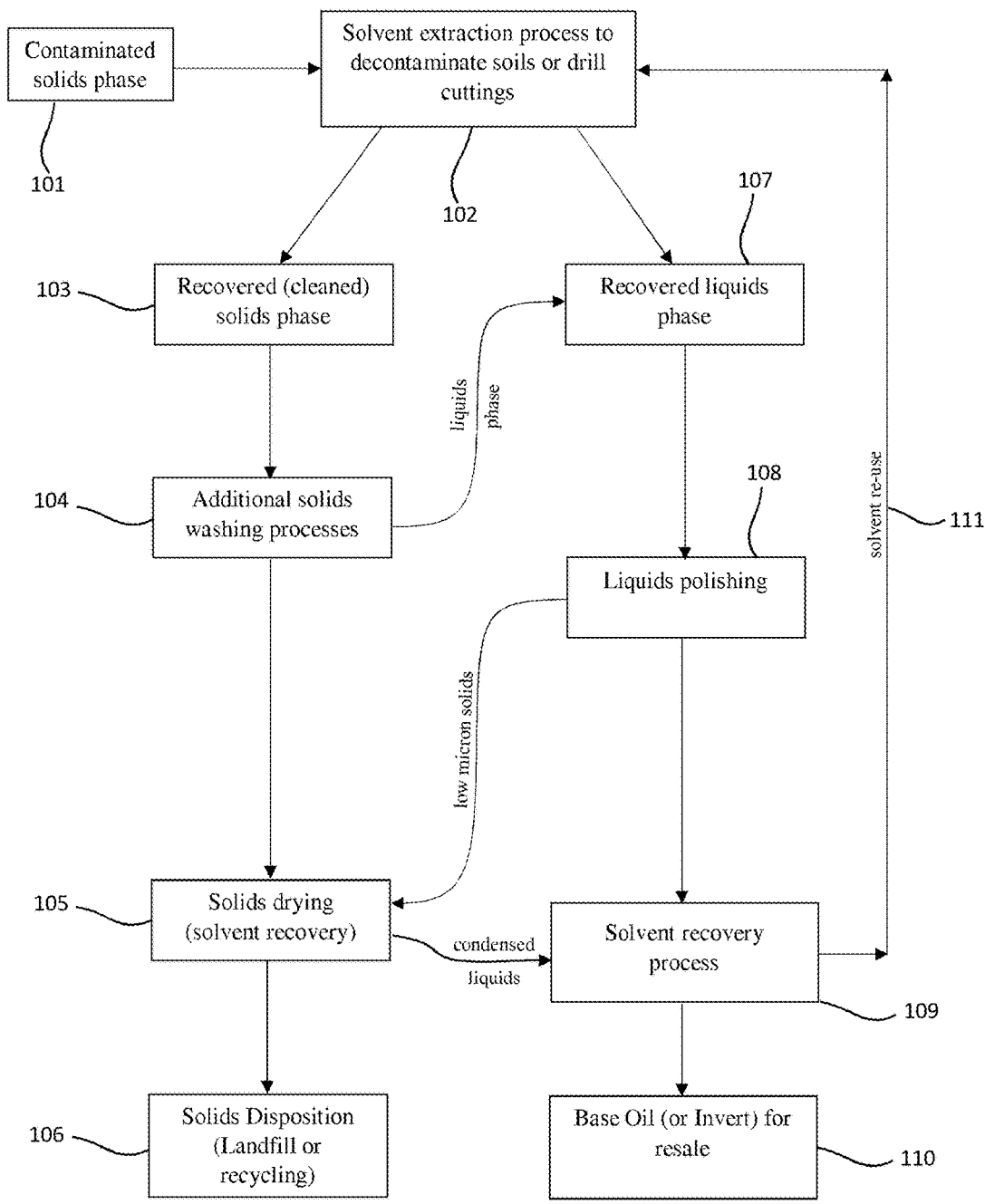
FIG. 1 is a flow scheme demonstrating an embodiment of a solvent extraction process for solids decontamination, and subsequent solvent recovery and re-use.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Terminology

Base Oil is the backbone of an invert drilling fluid and generally defined as either a distillate or synthetic. Synthetic base oils are typically 25% to 50% more expensive than distillates because additional refining is completed with synthetics, which causes the hydrocarbon chain to be tighter, as opposed to including more light-end or heavy-end fractions. The base oil is the hydrocarbon substance that provides the foundation on which to build a useful invert drilling fluid.

Oil Base Mud (OBM) or Invert comprises base oil and water in a water-in-oil emulsion, or oil-in-water emulsion and necessary additives which form the actual drilling fluid. The make-up of an OBM is often modified continuously to maximize its' usefulness during the drilling of a well. As the drill bit penetrates deeper through various formations, additives may be added to preferentially enhance desired mud properties for example, yield strength or gel strength, resulting in a higher rate of penetration or better hole stability.

Vapour pressure is defined as the pressure exerted by a vapour in thermodynamic equilibrium with its condensed liquid (or solid) phase at a given temperature in a closed system. It can be thought of as an indication of a liquid's evaporation rate. If the pressure of a closed system can be manipulated to be less than the vapour pressure of a fluid, then the liquid will boil, and become substantially vapour phase. Conversely if the pressure of a closed system can be manipulated to be greater than the vapour pressure of a fluid, then the vapour will condense, and become a substantially liquid phase.

Distribution Coefficient of a solvent extraction system is the ratio (at equilibrium) of solute concentration in the extract and raffinate phases. It gives a measure of affinity of the solute for the two phases. The raffinate phase being that phase which has had the solute removed; the extract phase being that phase which contains the removed solute.

The successful application of solid-liquid solvent extraction depends on several factors, briefly described below:

Preparation of the solid. In general, dissolution of one liquid in another is a chemically fast process. Mixing and increased temperatures will speed up the rate of liquids dissolution, yet, even left in an unagitated cold tank, two miscible liquids will, in general, dissolve quickly enough to satisfy most process requirements. However, the solid phase to be leached offers an additional barrier; dissemination of liquids through the solid pores. Diffusion of solute through the solid matrix is often the rate limiting step in the leaching process. The further the solvent must penetrate the solid to reach the solute, the slower the process. To combat this resistance, solids are typically ground into small particle sizes to increase specific interfacial surface areas and reduce diffusion path lengths. Smaller solid particle sizes lead to shorter diffusion times of solute to solvent.

Solvent selectivity. Solvents should be chosen to selectively dissolve the solute, which requires knowledge of the chemistry and especially the relative molecular polarities of both substances. In addition, the solute should have a high solubility in the solvent. The solvent should have a high 'carrying capacity' to minimize the amount of solvent required.

Solvent recovery. Most often, solvents are recovered by some form of distillation. When possible, a solvent with a low boiling point is selected for easiest recovery. That is to say there is a lessor energy requirement to regenerate the solvent by distillation. In addition, the solvent should have a significantly different boiling point than the solute to aid in solvent recovery and product purification.

Solvent toxicity. Non-toxic or low-toxicity solvents are preferred to reduce worker exposure to toxic substances. Solvents with the fewest hazardous properties should be chosen when two equally effective solvents present themselves as possible candidates.

Extraction method. It is conventionally understood that counter-current extraction is the most efficient method and is the most important industrially. In a series of mixing units, or stages, solid from the previous unit is mixed with solvent from the succeeding unit and then separated by settling, centrifugation, filtration, or other means. The solute impoverished solid is then moved to the next unit, while enriched solvent is moved to the previous unit. Using this principle, unextracted solute can be reduced to any desired amount if enough solvent and stages are employed.

The processes and products described herein pertain to leaching of a soluble drilling fluid base oil from an insoluble solid matrix of drill cuttings or, more generally, a useful organic liquid from a contaminated soil.

The processes and products described herein categorize a highly selective solvent blend useful for the extraction of drilling fluid base oil from contaminated soils.

The processes and products described herein also describe embodiments of solvent extraction process schemes useful to produce the solvent blend.

The processes and products described herein also describe the re-use of the selective solvent blend in a solvent extraction process aimed at decontaminating soils and/or drill cuttings produced from drilling operations of drilling fluid base oil.

The 'waste' drill cuttings, which still contain appreciable amounts of hydrocarbons (up to 50% by volume), inorganic chemicals, and other potentially environmentally harmful substances, are stabilized with a bulking agent, such as sawdust or fly-ash before being transported to a secure landfill.

In most regulatory jurisdictions, disposal of drilling waste in hazardous waste landfills does not indemnify the original waste producer of any legal liability in the event of an environmental spill. Liability for clean-up costs following an environmental spill of drill cuttings waste may ultimately be traced back to the original waste producer. While landfill operators take every precaution to prevent harmful leachates from breaching the containment liner, the possibility still exists, which represents a business risk to the waste generators.

However, the organic base oil contained within such a solid matrix of drill cuttings could be recovered using a solvent extraction process scheme. A solvent is used to penetrate the pores of the solid waste drill cuttings to dissolve the target drilling fluid base oil solute.

U.S. Pat. No. 6,550,552 describes the use of solvent, for example hexane or ethyl acetate, to wash hydrocarbon contaminated drill cuttings. The liquids phase is centrifuged to remove at least a portion of the solids phase. The liquids phase is then treated in a fine film evaporator at atmospheric pressure, or less than atmospheric pressure which results in the solvent being recovered in the overheads and the boiler bottoms being recovered for reuse as a drilling fluid consisting of oil and clay. Aside from the potential safety hazards of U.S. Pat. No. 6,550,552 which does not incorporate a gas tight, oxygen deficient atmosphere, the recovered boiler bottoms will have a lessor value due to the fact that it is a mixture of oil and clay. Put simply, the presence of clay suggests at least a portion of drilled solids are present, which is viewed by the industry as the nemesis of high rates of drill penetration. The presence of clay will dictate a lower resale value for the oil. The resulting solids phase is dried before being returned to the environment, using commercial type equipment at a temperature of about 80° C., in order to remove the extraction solvent residues. This results in at least a portion of the contaminant being redeposited on the cleaned drill cuttings. As will be discussed below, the process disclosed within proposes the use of a proprietary solvent blend which features improved dissolving characteristics when mixed with a substrate containing modern oil base drilling fluids.

US Published Patent Application No. 2005/0236015 describes a method of using a volatile solvent for example, natural gas liquids including ethane, propane, butane and other $C_2$ to $C_4$ hydrocarbons which dissolve in oil base mud. The low boiling point solvents disclosed in US Published Patent Application No. 2005/0236015 are very easy to extract from the recovered oil base mud however, due to the high volatility of the $C_2$ to $C_4$ hydrocarbons, high pressure process equipment must be employed to contain the volatiles from escaping the process. Gas tight process equipment capable of containing the pressures necessary for such a system to operate safely would be substantially limiting to the economics of such a design.

U.S. Pat. Nos. 4,434,028 and 4,824,570 and US Published Patent Application No. 2004/0089321 describe a method for removing hydrocarbon constituents from contaminated drill cuttings. Cuttings to be treated are transferred into a pressure vessel wherein they are contacted with solvent which is a gas under ordinary conditions and either a liquid or supercritical fluid when subjected to increased pressure or reduced temperature. The constituents are transferred to the extractant and the extractant containing the constituents is withdrawn from the pressure vessel where the pressure is released and the extractant returns to a gas. The contaminant (in this case drilling fluid) is recovered and the solvent is recompressed to form a liquid phase for reuse. Like the aforementioned US Published Patent Application No. 2005/0236015, this would also require pressure vessels for the safe operation of such a method, high energy inputs for gaseous recompression, and typically only operate under batch conditions as opposed to a continuous process, which would be substantially limiting to the economics of the aforementioned processes.

U.S. Pat. Nos. 4,836,302 and 5,005,655 describe the use of a volatile HCFC (hydrochlorofluorocarbon) solvent to wash hydrocarbon contaminated drill cuttings. The drilling waste is first subjected to turbulent mixing which leaves the surface of the cuttings substantially free of oil; the cuttings are then washed with HCFC solvent to remove the remaining hydrocarbons. The processed drilling waste is then sent to a heated sea water (salt water) tank where volatile constituents are evaporated and the solids phase is then discharged to sea. This technology was thought to be well suited for off shore drilling, not only for the aforementioned reason (disposal at sea) but also, the art also discloses using cooler sea water as a condensing fluid to cool the solvent vapors and thus recapture the solvent for reuse. However, the process employed the use of HCFC solvents which are substantially banned from use in developed nations because HCFC's are a known ozone depleting substance. Essentially, U.S. Pat. Nos. 4,836,302 and 5,005,655 became obsolete because of the phase-out of hydrochlorofluorocarbons, before the term of the patent(s) expired.

U.S. Pat. No. 5,080,721 discloses the use of many different volatile solvents to wash hydrocarbon contaminated drill cuttings. In particular, halogenated solvents are cited as highly suitable solvents; halogenated solvents are now substantially banned from use in developed nations because halogenated solvents (e.g., chlorofluorocarbons (CFC's)) are known ozone depleting substances. U.S. Pat. No. 5,080,721 discloses that regardless of the solvent being employed, the solvent should be a liquid at ambient temperatures and pressures so as to permit operation at atmospheric pressure and minimize loss of solvent to the atmosphere. Such a method permitting even small flammable solvent losses is extremely dangerous because losses to the atmosphere could be explosive and lead to the loss of life or property.

Commonly owned, co-pending U.S. patent application Ser. Nos. 62/303,163; 62/303,169; 62/303,172 and 62/416,952, herein incorporated by reference in their entirety, disclose methods of mixing a miscible solvent with unstabilized drill cuttings to allow the solvent to dissolve in the contaminant, thereby altering the rheology of the hydrocarbon contaminant. The washing mechanism permits additional solid-to-liquid phase interaction moments as the solids phase and liquids phase are separated. The liquid phase mixture is moved to one or more fluids rehabilitation processes where the solvent is evaporated, condensed, and re-used in the wash process, and the oil phase is reused as a drilling fluid base. The solids phase mixture is moved to an operatively connected process for residual solvent extraction, for example, a solids dryer. The components and methods of the commonly owned co-pending patent applications disclose the process area being flooded with a gas substantially lacking oxygen. The patent applications also illustrate the need for regimented equipment design wherein only gas tight equipment is utilized so to prevent the escape of volatile vapors, or permeation of air containing oxygen into the process, thereby preventing an otherwise inert atmosphere from becoming flammable. The aforementioned commonly owned co-pending US patent applications describe the use of diluents (solvents) which are commercially available and generally bear the characteristics of having a low flash point (for example, less than 37° C.), and/or having a vapor pressure of 0.1 to 750 Torr at 20° C., and/or the liquids phase of the mixture is altered to have a yield point of less than 5 cP (centipoise), and/or a plastic viscosity of less than 1 Pa (Pascals).

In one embodiment of one such process, n-hexane is selected as a suitable solvent due to its high selectivity to drilling fluid base oil, low toxicity, and low boiling point. However, a plethora of other solvents could be used to achieve the same goals. The high cost of solvent and associated solvent extraction equipment lead to an ongoing search for ever more suitable and selective solvents. Any solvent, or blend of solvents, with improved properties of solute selectivity, and/or solute carrying capacity that enable less solvent to be used to achieve a given level of solute recovery would lead to reduced processing cost and could represent an improvement to the processes described herein.

The solvent used in the enhanced base oil recovery process can be recovered by distilling the combined solvent and solute, before the solvent can then be recycled to the extraction process for re-use.

A more detailed description and characterization of a recovered solvent blend for re-use in a solvent extraction process follows herein. The solvent blend has improved features when compared to commercially available solvents, and improves the separation selectivity and efficiency when applied in solid-liquid extractions of drilling fluid base oils from solid drill cuttings, and more generally in soil decontamination processes. The produced solvent blend is produced by way of said solvent extraction process.

FIG. 1 shows an exemplary simplified flow schematic for the process by which the solvent blend described herein is recovered. A contaminated solids phase (101) is first conveyed from an atmospheric tank to a gas tight solvent wash (solvent extraction) process (102). An embodiment of such a solvent wash process can use a gas tight wash tank, but those skilled in the art would recognize it could include any number of equipment types, such as a gas tight decanter centrifuge, gas tight mechanical separator, or gas tight clarifier etc. The cleaned solids (103) can be sent to additional wash processes (104) before being dried (105) and ultimately recycled, or discarded to a final disposition (106). Liquids recovered from the solvent wash process (107) can be sent for further liquids recovery in additional polishing stages (108). One embodiment of such a polishing process may use decanter centrifuges for solids removal, but other equipment types could be used, for example, a Lamella inclined plate clarifier, or settling tank, or disc-centrifuge, or filtration bank. The low micron solids removed from the polishing stage are sent for drying (105), while the solvent present in the recovered polished liquids phase is recovered in a solvent recovery apparatus and process (109), suitable for separation of the solvent/solute liquid mixture. Any flash distillation system such as a vacuum kettle, or rectification system such as a packed tower with reflux, may be used to recover the solvent while simultaneously removing undesired volatiles from the re-manufactured base oil (110). Recovered solvent is recycled back to the solvent wash process (111).

Figure 2:
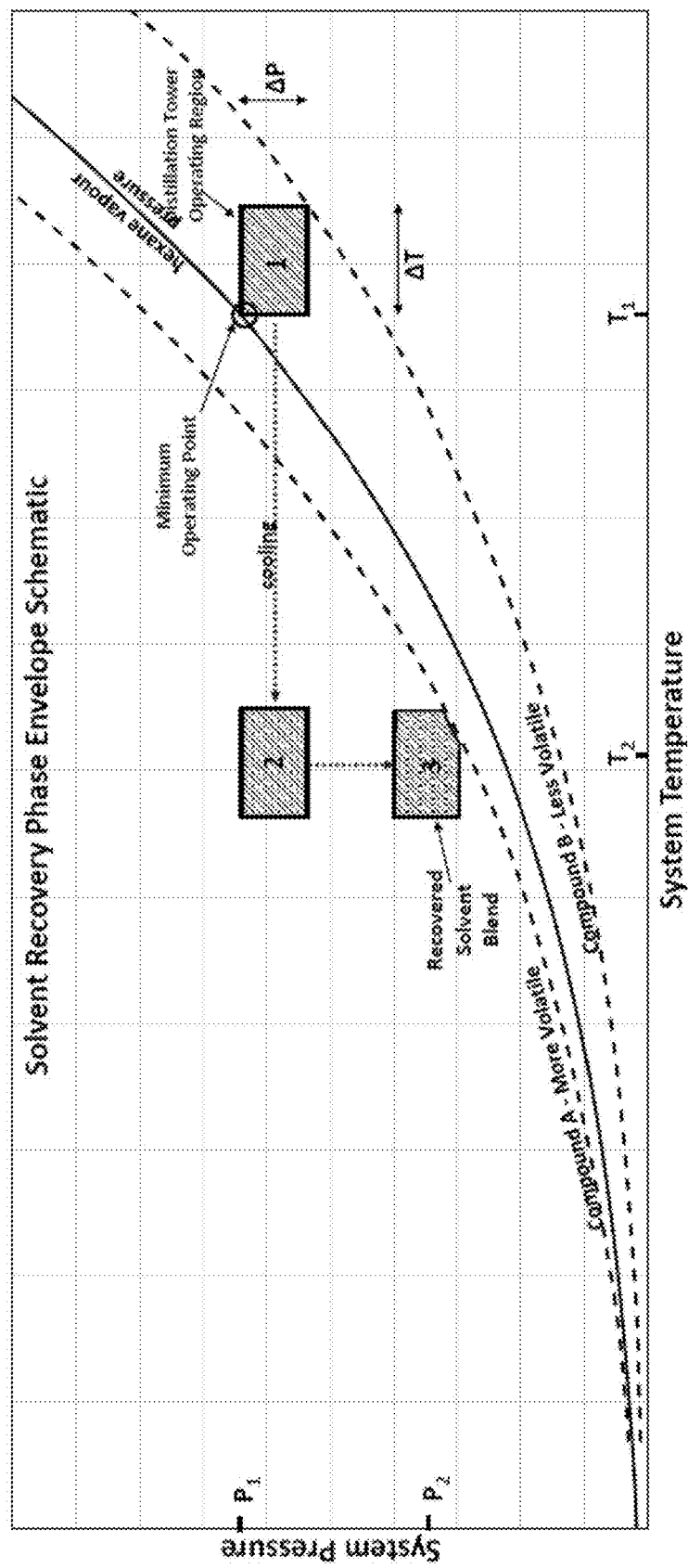
FIG. 2 is a solvent recovery phase envelope schematic describing a solvent blend generation mechanism.

FIG. 2 shows a solvent recovery phase envelope schematic. For exemplary purposes, it can be assumed that the initial solvent used in a solvent extraction process is n-hexane, and is to be recovered using a pressurized distillation process. The description is useful to explain how the solvent blend described herein is produced. FIG. 2 is a qualitative schematic only, aimed at explaining the key concepts of how a solvent blend can be produced from a mixture of miscible organic liquids.

The miscible mixture of organic liquids to be separated contains the initial hexane solvent and a drilling fluid base oil. The solute, a drilling fluid base oil, comprises a range of cyclic and non-cyclic carbon chains, predominantly in the range $C_{14}$ to $C_{22}$. Commonly owned, co-pending U.S. patent application Ser. No. _____ entitled Base Oil for Re-Use, filed of even date herewith, and herein incorporated by reference in its entirety, discloses a drilling fluid base oil produced from a solvent extraction process. Preferentially boiling off hexane vapour from a mixture of heavier organic liquids requires careful selection and process control of the distillation tower operating temperature and pressure. The engineering team determines an optimal target operating pressure (as denoted by system pressure $P_1$ in FIG. 2) for a host of reasons. For example, to achieve acceptable separation efficiency without the excessive cost of operating under vacuum. Subsequently, the target operating temperature is set (as denoted by system temperature $T_1$) to provide a theoretical ideal minimum operating point (as denoted by the "Minimum Operating Point", $P_1$, $T_1$) that will only recover hexane. If the system operating temperature decreases at all from $T_1$, or if the system pressure increases at all from $P_1$, then hexane will not boil, and will remain unseparated from the less volatile liquids in the tower bottom.

In practice, however, precise control of the distillation operating point is not possible due to the innate level of accuracy offered by any process instruments used for temperature and pressure measurement, and the minimum range that control acting elements can maintain. For example, the differential pressure instrument used to measure distillation tower pressure has a margin of error inherent to the chosen technology. The modulating control valve used to allow ingress of blanket gas for pressure maintenance also has some margin of error, and takes some amount of time, herein referred to as lag, to reach the desired position. Operations compensate for these effects by setting the actual distillation tower operating point more conservatively than the minimum operating point. In this example, the pressure is set a little lower than $P_1$, e.g., by 5%, and/or the temperature is set a little higher than $T_1$, e.g., by 5%.

Both the new set points, and the range between which the temperature and pressure may operate (as denoted by $\Delta P$ and $\Delta T$ in FIG. 2), combine to yield a practical operating pressure and temperature zone (as denoted by the "Distillation Tower Operating Region"), Region 1.

Lines A and B (FIG. 2) represent the vapour pressure curves of compounds A and B more and less volatile than hexane respectively. It will be seen even by those of ordinary skill that any compound having a vapour pressure curve that falls to the left of the operating point will be separated from the mixture along with hexane. Furthermore, it can be seen that any compound with relative volatility up to and including Compound B, has the potential to be boiled off and recovered within the solvent blend in the system defined in FIG. 2.

To illustrate the potential range of products that could potentially be recovered in a solvent blend in the current example, Table 2 below is a list of organic liquids with normal boiling points close (+/−5° C.) to that of hexane.

TABLE 2

(Organic Liquids with normal boiling point close to Hexane)

| Compound | Normal Boiling Point (° C.) | Relative to Hexane (° C.) |
|---|---|---|
| Vinyl acetate | 73 | +4.3 |
| 4,4-dimethyl-1-pentene | 73 | +4.3 |
| 3-chloro-2-methyl propene | 72 | +3.3 |
| allyl bromide | 71 | +2.3 |
| 1-hexyne | 71 | +2.3 |
| 3-methyl-trans-2-pentene | 70 | +1.3 |
| cis-2-hexene | 69 | +0.3 |
| 2,3-dimethyl-1,3-butadiene | 69 | +0.3 |
| n-Hexane | 68.7 | — |
| trans-2-hexene | 68 | −0.7 |
| 3-methyl-cis-2-pentene | 68 | −0.7 |
| 1-chloro-2-methyl propene | 68 | −0.7 |
| trans-3-hexene | 67 | −1.7 |
| 2-methyl-2-pentene | 67 | −1.7 |
| cis-3-hexene | 66 | −2.7 |
| 4-methyl cyclopentene | 66 | −2.7 |
| 2-ethyl-1-butene | 65 | −3.7 |
| 3-methyl cyclopentene | 65 | −3.7 |
| 1-chloro-1-butene | 64 | −4.7 |

The list from Table 2 above is not exhaustive, and serves only to highlight that many organic liquids exist with close enough boiling points that they could be indistinguishable from one another during a distillation type separation. The compounds listed in Table 2 are exemplary to illustrate close boiling liquids, and do not necessarily indicate those compounds that would be classified as improved solvents when compared to n-hexane, in this example.

Region 1 in FIG. 2 describes the phase envelop of the mixture that has been introduced to the distillation system. Subsequently, in this example, the vapour overheads are cooled until they form Region 2. The solvent blend is cooled ($T_2$) and condensed back to liquid phase. This can be achieved by cross-exchange of the hot overhead vapours with some cooler utility heat medium(s), or with some other cooler process stream(s). In one embodiment, the hot overhead vapours leaving the tower are cross exchanged with the cooler tower inlet feed stream in a heat exchanger. The cooled vapours leaving said exchanger are then cooled further in an aerial type condenser that uses ambient air and fans, until all the condensable vapours have been condensed.

For exemplary purposes only, it is assumed that the recovered solvent blend is to be re-used in a near atmospheric pressure solvent extraction process. Therefore, the blend is reduced in pressure to near atmospheric pressure, $P_2$. Region 3 represents the recovered solvent blend to be re-used in the solvent extraction process. Notice that the pressure $P_2$ can be adjusted to flash off some of the more volatile components that may be less useful solvents, or may flash during the solvent extraction process and so would not be beneficial to keep with the mixture. The missing corner of Region 3 represents those light-ends that are flashed off to prevent accumulation in the solvent system. Those removed light-end portions can be condensed and re-used in another process, or sold as a bi-product from the solvent wash process.

The solvent blend described herein is produced by way of a distillation process. Said distillation process uses a miscible mixture of organic liquids as its feedstock, that are produced from a solvent extraction process aimed at cleaning waste drill cuttings, or more generally decontaminating soils, contaminated with organic liquids contained within the solid matrix of the soil. The recovered solvent blend contains the initial solvent and an array of other compounds that were present within the solid matrix of soil or drill cuttings.

It follows that the re-use of the solvent blend in the same solvent extraction process will have a higher selectivity to the solutes, since the same array of individual solvents present within the recovered solvent blend is also present in the solid matrix. Working with the well-established principle of 'like-dissolves-like', a solvent composition that is closer to that of the solute will exhibit an improved ability to dissolve the solute, thereby improving the extraction efficiency, and remove more of the solute per unit solvent volume.

The concept of a solvent distribution coefficient ($K_d$) can be used to compare the selectivity of solvents in a specific application. The distribution coefficient of a solvent is defined as the ratio (at equilibrium) of solute concentration in the extract to solute concentration in the raffinate. Highly selective solvents leach most of the solute to the extract, leaving little behind in the raffinate. The exact laboratory methodologies used to determine distribution coefficients are well known in the art. This distribution coefficient can be used as a measure of solvent selectivity and efficiency. It can be determined for the initial virgin solvent, and then compared against the same coefficient for the solvent blend produced by the extraction and recovery processes. The more selective solvent blend will have a higher distribution coefficient than the initial solvent. The higher the distribution coefficient of the solvent blend relative to that of the initial solvent, the greater the improvement in solvent selectivity and solvent performance.

Table 3 below illustrates the improvement in solvent selectivity and separation performance. In this example, the solvent blend has an improved distribution coefficient, $K_d$=5.0 when compared to the original fresh n-hexane solvent, $K_d$=4.0.

TABLE 3

(Solvent Separation performance)

| | n-hexane | Solvent Blend | +/− | % change |
|---|---|---|---|---|
| Solvent Distribution Coefficient, Kd | 4.0 | 5.0 | 1.0 | 25% |
| Solute Concentration in Raffinate, % by mass | 3.0 | 2.0 | 1.0 | 10% |

Complementary to the higher distribution coefficient of an improved solvent blend, the raffinate, in this case a decontaminated solid, would contain less residual solute than when using the virgin solvent alone. The residual oil left behind in the solid waste stream would be reduced, similarly representing process and product improvement as described herein. Table 3 above shows the reduction in raffinate solute concentration when using the solvent blend as compared to using n-hexane alone. Using only n-hexane solvent for extraction, the solute concentration remaining in the raffinate is 3.0% by mass. The solvent blend reduces that concentration to 2.7% by mass, representing a 10% improvement in this measure of separation performance. It is to be understood that while the results demonstrated in Table 3 are representative of a typical solvent blend described herein, it is in no way intended to be limiting to the enhancements that may be achieved from the processes and products described herein.

The absolute residual solute concentration in the solid raffinate phase after solvent extraction is preferably less than 5% (by volume), more preferably less than 3% (by volume), yet more preferably less than 1% (by volume), and most preferably less than 0.1% (by volume).

Over and above these described results, the relative residual solute concentration in the solid raffinate phase after solvent extraction is less than that of a single virgin solvent system. The reduction in residual solute concentration is at least 0.1% (by volume), more preferably at least 1% (by volume), yet more preferably at least 5% (by volume), and most preferably at least 10% (by volume).

Clearly the solvent blend created is more useful and therefore more valuable than operating using a single solvent alone.

The preferred solvent blend has chemical and physical property characteristics delineated in the following specification:

The solvent blend comprises at least one straight chain, and/or branched, and/or cyclic, hydrocarbon of composition:
i. Greater than 90% (by volume) hydrocarbon molecules containing seven carbon atoms or fewer,
ii. Greater than 95% (by volume) hydrocarbon molecules containing eight carbon atoms or fewer,
iii. Greater than 99% (by volume) hydrocarbon molecules containing nine carbon atoms or fewer,
iv. Less than 1% (by volume) hydrocarbon molecules containing five carbon atoms or fewer.

The recovered solvent blend described herein has a normal (atmospheric) boiling point range preferably in the range 50° C. to 100° C., more preferably in the range 60° C. to 80° C., most preferably in the range 65° C. to 75° C.

The recovered solvent blend described herein has a mass density (corrected to 15° C.) preferable in the range 600 kg/m³ (kilogram/cubic meters) to 850 kg/m³, more preferably in the range 630 kg/m³ to 750 kg/m³.

The recovered solvent blend described herein has a higher selectivity to the solutes as compared to the initial solvent. Qualitatively, the solvent blend has a higher distribution coefficient than the initial solvent. Quantitatively, the recovered solvent blend has a distribution coefficient at least 5%, preferably at least 10%, more preferably at least 15%, and yet most preferably at least 20% greater than that of the initial solvent.

Figure 3:
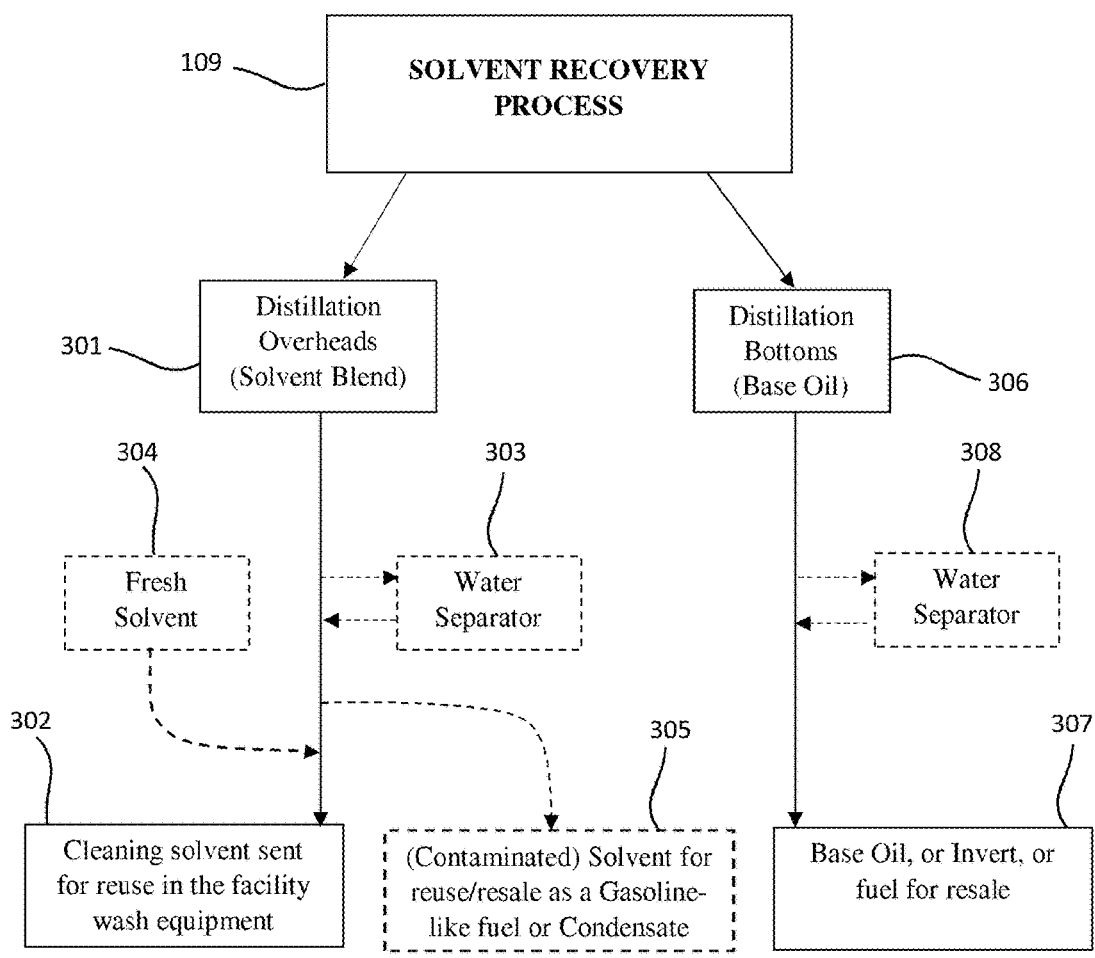
FIG. 3 is a flow chart demonstrating an embodiment of a solvent recovery process as described herein.

Over time however, accumulations of undesired volatiles and water may cause the solvent to become less effective as a cleaning solvent, or cause the cleaned solids to become re-contaminated with higher levels of undesired volatiles. FIG. 3 is a process flow diagram to illustrate an exemplary scheme to refresh a contaminated cleaning solvent (302). If immiscible, any accumulations of water can be removed from the recovered solvent (301) by employing such things as a conventional coalescing filter, or membrane filter, or phase separation tank (303) so that the water phase can be sent for suitable disposition. If the recovered solvent becomes contaminated with undesired volatiles, then a portion of the recovered solvent (305) will be replaced with fresh solvent (304), to return the cleaning solvent (302) to the desired purity, as determined by the operator of the drilling waste processing facility for being most effective at cleaning drilling waste (102). The portion of solvent otherwise contaminated (305) and therefore removed from the process can be reused as a gasoline-like fuel source, or marketed and sold in a similar fashion as that of produced condensate. Similarly, the distillation bottoms (306), water separation (308) and resulting base oil, invert or fuel (307) are demonstrated in the figure on the distillation bottoms side as well.

Those skilled in the art will recognise that a solvent blend will also be useful in removing hydrocarbon contamination from soil matrices other than drilling waste, for example soils contaminated by industrial or commercial processes such as refineries, gasoline fueling stations, or pipeline spills.

From the foregoing, and the appended claims, it will be seen that this invention is one well adapted to attain all the ends and objects herein set forth, together with other advantages and features which are obvious and inherent to the process and method, to those skilled in the art.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A solvent blend particularly adapted for use in removing hydrocarbon contamination from soil matrices or drilling wastes,
    wherein, the solvent blend is used to wash a hydrocarbon containing soil matrix or drilling waste,
    the solvent blend being comprised of a first solvent which is soluble in the hydrocarbon contamination, and at least one secondary solvent which is more soluble in the hydrocarbon contamination,
    the said secondary solvent, or group of secondary solvents, being substantially comprised of hydrocarbon molecules which were extracted from the hydrocarbon contamination of the soil matrix or drilling waste,
    the solvent blend demonstrating an improved selectivity and/or solute solubility, of the hydrocarbon contamination in the soil matrix or drilling waste, when compared to the first solvent alone.

2. The solvent blend of claim 1, wherein the solvent blend is particularly adapted to be recycled to the process of decontamination of soil matrices or drilling waste containing a hydrocarbon phase.

3. The solvent blend of claim 1, wherein the solvent blend contains at least one straight chain hydrocarbon, and/or one branched hydrocarbon, and/or one cyclic hydrocarbon, wherein more than 99% (by volume) of the hydrocarbon chains contain seven carbon atoms or fewer.

4. The solvent blend of claim 1, wherein the solvent blend contains at least one straight chain hydrocarbon, and/or one branched hydrocarbon, and/or one cyclic hydrocarbon, wherein less than 1% (by volume) of the hydrocarbon chains contain five carbon atoms or fewer.

5. The solvent blend of claim 1, wherein the solvent blend has a normal boiling point range of between 50° C. and 100° C.

6. The process of claim 1, wherein the recovered solvent has a standard mass density at 15° C. of 600 kg/m$^3$ to 850 kg/m$^3$.

7. The solvent blend of claim 1, wherein the solvent blend has a distribution coefficient at least 5% greater than the distribution coefficient of a non-contaminant containing solvent.

8. A solvent extraction process for removal of hydrocarbon contamination from soil matrices or drilling wastes,
    wherein, a solvent blend is used to wash a hydrocarbon containing soil matrix or drilling waste,
    the solvent blend being comprised of a first solvent which is soluble in the hydrocarbon contamination, and at least one secondary solvent which is more soluble in the hydrocarbon contamination,
    the said secondary solvent, or group of secondary solvents, being substantially comprised of hydrocarbon molecules which were extracted from the hydrocarbon contamination of the soil matrix or drilling waste,
    at least a portion of the secondary solvent, or group of secondary solvents recovered from the extraction process, are recycled to the solvent extraction process with the first solvent,
    the solvent blend demonstrating an improved selectivity and/or solute solubility, of the hydrocarbon contamination in the soil matrix or drilling waste, when compared to the first solvent alone.

9. The process of claim 8, wherein the hydrocarbon contamination and solvent blend are recovered and at least partially vaporized during a purification stage.

10. The process of claim 9, wherein the recovered solvent blend contains at least one straight chain hydrocarbon, branched hydrocarbon, or cyclic hydrocarbon, wherein more than 99% (by volume) of the hydrocarbon chains contain nine carbon atoms or fewer.

11. The process of claim 8, wherein the recovered solvent blend contains at least one straight chain hydrocarbon, branched hydrocarbon, or cyclic hydrocarbon, wherein less than 1% (by volume) of the hydrocarbon chains contain five carbon atoms or fewer.

12. The process of claim 8, wherein the recovered solvent blend has a normal boiling point range of between 50° C. and 100° C.

13. The process of claim 8, wherein the recovered solvent blend has a standard mass density at 15° C. of 600 kg/m$^3$ to 850 kg/m$^3$.

14. The process of claim 8, wherein the recovered solvent blend has a distribution coefficient at least 5% greater than the distribution coefficient of a non-contaminant containing solvent.

15. The process of claim 8, wherein the recovered solvent blend has a distribution coefficient at least 10% greater than the distribution coefficient of a non-contaminant containing solvent.

16. The process of claim 8, wherein the decontaminated soil matrix or drilling waste contains a residual solute concentration which has been reduced to less than 5% by mass.

17. The process of claim 16, wherein the residual solute concentration in the decontaminated soil matrix or drilling waste has been reduced by at least 1% by mass as compared to solvent extraction using a single virgin solvent alone.

18. The process of claim 16, wherein the relative residual solute concentration in the decontaminated soil matrix or drilling waste has been reduced by at least 5% by mass as compared to solvent extraction using a single virgin solvent alone.

19. The process of claim 16, wherein the residual solute concentration in the decontaminated soil matrix or drilling waste has been reduced by at least 20% by mass as compared to solvent extraction using a single virgin solvent alone.

20. The process of claim 16, wherein the residual solute concentration in the decontaminated soil matrix or drilling waste has been reduced by at least 50% by mass as compared to the solvent extraction using a single virgin solvent alone.

\* \* \* \* \*